Patented May 5, 1936

2,039,297

UNITED STATES PATENT OFFICE 2,039,297

SEPARATING PHOSPHORUS

Harry A. Curtis, Knoxville, Tenn., assignor to Tennessee Valley Authority, Wilson Dam, Ala., a corporation of United States of America No Drawing. Application May 14, 1935,
Serial No. 21,385

4 Claims. (Cl. 23—223)

(Granted under the act of March 3, 1883, as amended April 30, 1928; 370 O. G. 757)

This application is made under the act of April 30, 1928, and the invention herein described, if patented, may be manufactured and used by and for the Government for governmental purposes without the payment to me of any royalty thereon.

This invention relates to the art of the manufacture of phosphorus and its compounds and particularly to the separation of elemental phosphorus from the hot gaseous mixtures produced in phosphate reduction furnaces.

One of the objects of this invention is to condense elemental phosphorus and separate dust particles from a hot gaseous mixture containing the same by the use of an aqueous solution which is non-corrosive in respect to the condensing and auxiliary apparatus with which it must come in contact. Another object of this invention is to remove certain small proportions of oxidized phosphorus compounds, which are present in the hot gaseous mixture containing elemental phosphorus, during the process of condensing of the phosphorus, in order that the corrosive properties of the non-condensable gas leaving the condensing and auxiliary apparatus may be reduced or eliminated. Other objects of this invention include condensing the elemental phosphorus by means of an aqueous solution of such a character that the impurities in the gas, even though absorbed by the aqueous solution, separate from it and do not accumulate in this aqueous solution.

It has been proposed to contact the hot gaseous mixtures from phosphate reduction furnaces with a jet of water to condense the phosphorus and it has also been proposed to effect this condensation by contacting the gases with an acid solution of one-tenth to normal concentration. The handling of the hot gaseous mixture from phosphate reduction furnaces presents a serious chemical engineering problem in the form of the control of the corrosion on all materials of construction with which these gases come in contact. I have found that elemental phosphorus and the associated dust particles contained in the hot phosphate reduction furnace gases may be effectively condensed and separated from the non-condensable gases contained in the mixture by contacting the hot mixture with a solution of calcium hydroxide and water, commonly known as lime water. The condensed phosphorus is separated from the major portion of the lime water and the sludge, which comprises dust, calcium phosphate resulting from the oxidized phosphorus in the hot gaseous mixture, and a small amount of lime water.

The most important thermal processes for the production of elemental phosphorus and its compounds are the electric furnace process and the blast furnace process. One example of my process is given for the manufacture of elemental phosphorus using the electric furnace process. A charging stock, prepared so that the constituents are in the following proportions, 6250 pounds of phosphate rock containing 32 to 33% $P_2O_5$, 828 pounds of silica and 1219 pounds of coke, is charged continuously to the electric furnace from which is withdrawn continuously the hot gaseous mixture, containing elemental phosphorus, carbon monoxide and mechanically entrained particles from the charge and molten calcium silicate slag, and molten ferrophosphorus. The hot gaseous mixture is passed through a dust collector which removes a substantial proportion of the entrained solid particles and is then passed into a condensing apparatus where it is contacted counter-currently with an aqueous solution of calcium hydroxide containing 0.1 and 0.2 grams of calcium hydroxide per hundred grams of water, commonly known as lime water. The gaseous mixture which separates is principally carbon monoxide saturated with water vapor and contains a very small proportion of elemental phosphorus which may be removed by the use of an adsorbent. The lime water, condensed phosphorus, the dust particles and the precipitated phosphorus oxidation products are withdrawn from the bottom of the condenser and permitted to stratify. These layers of lime water, condensed phosphorus and sludge are separated and the lime water returned to the condensing apparatus with the addition of calcium hydroxide as required to bring it up to strength. The separated sludge may be utilized by incorporating it with lump phosphate rock, with fine phosphate rock which is subsequently agglomerated, or by otherwise incorporating it with constituents of a phosphate reduction furnace charging stock.

It is evident that there are numerous factors which will influence conditions for the most satisfactory operation of my process, the actual limits of which cannot be established except by a detailed study of each set of raw materials and intermediate and finished products involved.

Certain terms used throughout the description and claims are understood to have the following meaning: Phosphate reduction furnace means and includes any electric or fuel-fired furnace in which the phosphatic charge reacts to produce a gaseous mixture containing elemental phosphorus; condensing apparatus and auxiliary equipment means and includes any unit for condensing phosphorus vapors and may consist of a plurality of such units which are operated in such a manner as to carry out the condensation stepwise; sludge means and includes that layer of stratified material which is comprised principally of dust carried over mechanically with the gas and some precipitated calcium phosphate wet with some lime water and under some circumstances containing a small proportion of condensed phosphorus; condensed phosphorus means and includes that stratified layer which is predominantly elemental phosphorus, either liquid or solid, but which may contain small proportions of sludge and lime water which have not been separated due to unsatisfactory conditions of operation; and lime water means and includes an aqueous solution of calcium hydroxide together with small proportions of materials which have been absorbed from the hot gaseous mixture containing elemental phosphorus.

It will therefore be seen that this invention may be actually carried out by the modification of certain details without departing from its spirit or scope.

I claim:

1. Process of separating phosphorus from a hot gaseous mixture containing elemental phosphorus which comprises contacting continuously the hot gaseous mixture with lime water; separating the fixed gas from the condensed phosphorus, sludge and lime water; separating the condensed phosphorus, sludge and lime water; drying the sludge; incorporating the dried sludge in a phosphorus reduction furnace charging stock, and recycling the separated lime water in contact with the hot gaseous mixture containing elemental phosphorus.

2. Process of separating phosphorus from a hot gaseous mixture containing elemental phosphorus which comprises contacting continuously the hot gaseous mixture with lime water; separating the fixed gas from the condensed phosphorus, sludge and lime water; separating the condensed phosphorus, sludge and lime water, and incorporating the dried sludge in a phosphorus reduction furnace charging stock.

3. Process of separating phosphorus from a hot gaseous mixture containing elemental phosphorus which comprises contacting continuously the hot gaseous mixture with lime water; separating the fixed gas from the condensed phosphorus, sludge and lime water, and separating the condensed phosphorus sludge and lime water.

4. Step in process of separating phosphorus from a hot gaseous mixture containing elemental phosphorus which comprises contacting continuously the hot gaseous mixture with lime water.

HARRY A. CURTIS.